United States Patent [19]
Choate

[11] Patent Number: 5,498,088
[45] Date of Patent: *Mar. 12, 1996

[54] KEYBOARD ARRANGEMENT TO MAXIMIZE TYPING SPEED AND EASE OF TRANSITION FROM A QWERTY KEYBOARD

[76] Inventor: John I. M. Choate, P.O. Box 65, Seminole, Okla. 74818-0065

[*] Notice: The term of this patent shall not extend beyond the expiration date of Pat. No. 5,352,050.

[21] Appl. No.: 273,205

[22] Filed: Jul. 11, 1994

Related U.S. Application Data

[63] Continuation-in-part of Ser. No. 918,767, Jul. 27, 1992, Pat. No. 5,352,050.

[51] Int. Cl.$^6$ ........................................... B41J 5/10
[52] U.S. Cl. ............................ 400/486; 400/484
[58] Field of Search .................... 400/472, 482, 400/484, 486, 487

[56] References Cited

U.S. PATENT DOCUMENTS

| | | | |
|---|---|---|---|
| 1,336,122 | 4/1922 | Banaji | 400/486 |
| 1,506,426 | 8/1924 | Hoke | 400/486 |
| 2,040,248 | 5/1936 | Dvorak et al. | 400/486 |
| 2,080,457 | 5/1937 | Bower | 400/486 |
| 3,847,263 | 11/1974 | X | 400/486 |
| 4,715,736 | 12/1987 | McGunnigle | 400/486 |

FOREIGN PATENT DOCUMENTS

| | | | |
|---|---|---|---|
| 67795 | 10/1948 | Denmark | 400/486 |
| 116834 | 7/1984 | Japan | 400/486 |
| 116585 | 6/1946 | Sweden | 400/486 |
| 116538 | 6/1918 | United Kingdom | 400/486 |

*Primary Examiner*—Stephen Funk

[57] ABSTRACT

A keyboard arranged for efficiency in learning and in operating. Home keys are assigned according to the frequency of use of the letters. A user can select a new format with eleven or more keys in the same location as the conventional typewriter letter format. The keyboard is suitable for typewriters, personal computer keyboards. Different keyboards can be selected according to the frequency of use of the letters. By concentrating work on the home row, finger extension, flexion, and travel is reduced, allowing increased speed, accuracy and safety. By maintaining the same locations, most of the difficulty in relearning a new keyboard layout can be eliminated.

17 Claims, 10 Drawing Sheets

KEYBOARD ARRANGEMENT TO MAXIMIZE TYPING SPEED AND EASE OF TRANSITION FROM A QWERTY KEYBOARD

CROSS REFERENCE TO RELATED APPLICATIONS

Continuation-in-part of Ser. No. 07/918,767 filed Jul. 27, 1992, now U.S. Pat. No. 5,352,050.

BACKGROUND OF THE INVENTION

1. Technical Field

The present invention is directed to improvements in typing systems, typing training, keyboard arrangement, disability accommodation, medical and physical therapy for repetitive stress syndrome, multi lingual translation, communication, displaying information on video terminals or monitors, word processing, data entry, encryption substitution, psychokinetic, code as well as many other applications.

Writing improvements generally deal with increased speed, rather than with the preservation. For instance, for thousands of years chiseling has made a more permanent writing as compared to drawing on paper, but, chiseling is so cumbersome, low tech, and expensive, it is now generally reserved for office building entrances, or grave markers. You may disagree when events occurred, but the following highlights improvements that have made writing faster.

3rd millennium BC: Asians chisel pictographs into stone with a writing speed of: 5 WORDS AN HOUR.

2nd Millennium B.C.: Chinese or Egyptians invent HIEROGLYPHICS, written on stone or metal; (10 Commandments written on stone tablets) and with it, the writing speed doubles to: 10 WORDS AN HOUR.

18th Century B.C.: Egyptians discover papyrus, Babylonians use clay, Semites use vellum and these new surfaces allow writing speed to double to: 20 WORDS AN HOUR.

16th century B.C.: Hebrews inspired to use 22 character alphabet, e.g., writing of the Old Testament right to left on scrolls. Consequently, the writing speed doubles to: 40 WORDS AN HOUR.

1st millennium B.C.: Greeks refine their alphabet to 24 letters and change writing from left to right, use vegetable stains, blood and mud for dyes and again the writing speed doubles to: 80 WORDS AN HOUR.

4th century B.C.: Romans develop alphabet of 24 capital letters (Latin), no punctuation or spacing, and pages (early books). With these innovations, the writing speed doubles to: 160 WORDS AN HOUR.

1st millennium A.D.: Europeans invent punctuation, with small letters and as a result, the writing speed doubles to: 5 WORDS A MINUTE.

15th century A.D.: Italians, (including Leonardo Da Vinci with backwards writing), invent ink, quill, and pen and writing speed doubles to: 10 WORDS A MINUTE.

2. Description of Related Art

In 1867, a Milwaukee printer, C. Latham Sholes invents the typewriter and with it the writing speed doubles to: 20 WORDS A MINUTE. See discussion of Syllabic typewriter, Dothan Shelton U.S. Pat. No. 3,970,185 issued in 1976.

In 1867 (later, perhaps that same year) a Milwaukee secretary invents "touch typing," and the writing speed DOUBLES to 40 WORDS A MINUTE and jams mechanical typewriters keys and hammers. (See discussion of QWERTY (FIG. 1) in Combinatorial Keyboards which encode Characters and a space, Richard Holden U.S. Pat. No. 4,655,621 issued in 1987.) High schools and business schools teach what is called the "touch system" of typing. The "touch system" of typing simply means that the typist memorized the keyboard so thoroughly that she can type without looking at it, and that she learns to use all of her fingers, each finger on a particular group of keys. Untrained typists use what is called the "hunt and peck" system. Usually they use only their two forefingers or at most their four best fingers, the forefinger and middle fingers. Actually these typists can learn the keyboard just as well and go just about as fast, but very fast typing is more tiring for them than for the touch typist because the hands have to leap all around the keyboard to reach all the keys with only two or four fingers. See *Ill. World Enc.*

1872 C. Latham SHOLES designed the "Obsolete" keyboard, also referred to as the "QWERTY" keyboard, to jam fingers, not keys. Today, hundreds of millions of keyboards and people follow QWERTY (FIG. 1) system. See discussion of handicaps of so-called "universal" keyboard below in the discussion of A. Dvorak, et al. U.S. Pat. No. 2,040,248.

The first typewriter keyboard worked with three or four rows of buttons, called "keys". Each key was the size of a thumb nail. All keys can be depressed by the outstretched fingers of the hands of the typist in an arrangement about the width of two hands. All keys were connected to metal rods, which looked like little hammers. When the typist flexed (retracted) a finger, the finger depressed (pushed down) a key. Each of the twenty six alphabet keys were connected to pulleys and springs, which lifted the hammer to strike paper wrapped against a round rubber tube called a "platen." The end of the hammer face had a reverse metal letter or "type face". This type face left an impression on the paper through a piece ribbon (inked cloth). If the typist were quick, two or more hammers could hit at the same time and collide, a process called "jamming". The typist would have to stop work and separate the hammers.

To remedy this jamming, Sholes' keyboard located the most used letters away from the home row, so fingers would reach between keys. The term "home row" is used to indicate the row where the fingers are normally at rest, e.g., "A S D F G H J K L;" for the "QWERTY" or "obsolete" keyboard. In effect, Sholes jammed fingers instead of keys.

For example, normally, the middle finger on the left hand rests on the home row key "D". To reach the "E" key on the "obsolete" keyboard, the finger must travel one half inch forward, press the "E" key, and then travel one half inch back to return to the "D" key. A similar journey must be made to type any keys on the top row (Q W E R T Y U I O P) or on the bottom row (Z X C V B N M) of the obsolete keyboard. But, the letter "E" is used more than "D". Thus, having "E" on the top row causes unnecessary flexing. The same applies to the T-R-I-N keys, which are also used much more than their sister keys G-F-K-J. If typists knew that "J" and "K" are the second and fourth least used letters in English, they would be hopping mad.

In 1909, U.S. Pat. No. 943,466 (Type-Writer Keyboard) issued to S. W. Rowell. Rowell grouped nine of the most often used letters in English (to wit: AEHINORST), accounting for 69% of total letter frequency, together in the center of the Keyboard. Rowell retained the four horizontal row arrangement of the QWERTY (FIG. 1) designed keyboard. However, Rowell relocated all 26 letters of the alphabet from the location of the keys on the QWERTY (FIG. 1) keyboard, that is, none of the letters retained their former positions. Rowell's feature was to put letters in position "to be touched by either or both hands."

In 1920, U.S. Pat. No. 1,336,122 (Keyboard for Typewriters) issued to F. M. M. Banaji. Banaji retained the four horizontal row arrangement of the QWERTY (FIG. 1) keyboard. However, Banaji relocated 18 letters of the alphabet from the location of the keys on the QWERTY (FIG. 1) keyboard and only 8 letters retained their former positions (to wit: BDEKRTYZ). Banaji chose least used keys on the home row of the keyboard (to wit: FKLQX). Banaji's feature was to relieve pressure on the index fingers (by substituting Q and X for G and H).

In 1920, U.S. Pat. No. 1,342,233 issued to C. Wolcott. Wolcott retained 4 horizontal row arrangement of the QWERTY (FIG. 1) keyboard. However, Wolcott relocated 24 letters of the alphabet from the location of the keys on the QWERTY (FIG. 1) keyboard and retained only 2 letters in their former positions (to wit: CP). Wolcott selected least used keys on the home row of the keyboard (to wit: BJQUW). Wolcott's feature is the "approximately even division" of "labor between the right and left hand."

Figure 1:
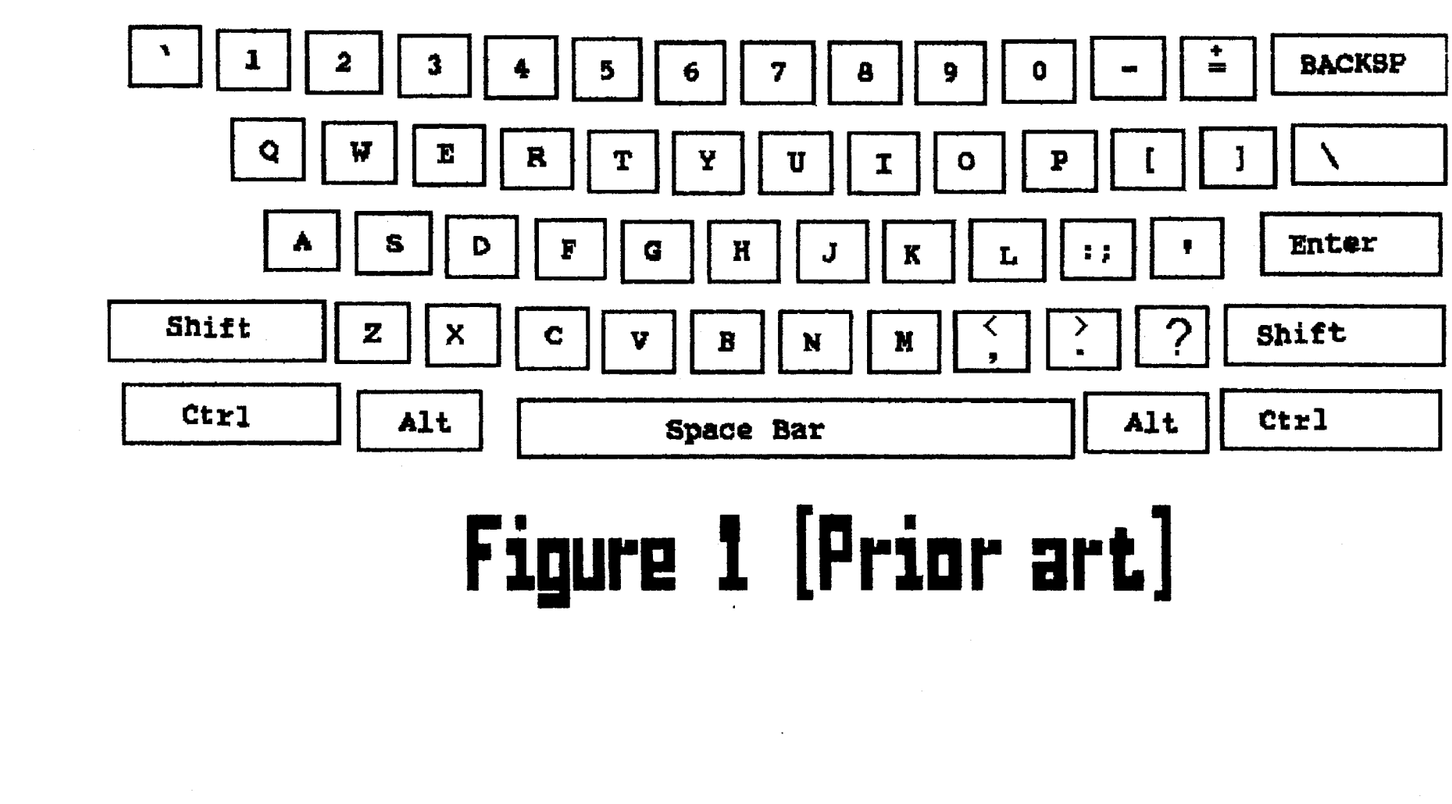
FIG. 1 is a plan view of a prior art QWERTY keyboard.

1924 Typewriter Keyboard Arrangement, U.S. Pat. No. 1,506,426 issued to R. E. Hoke. Hoke retains the 4 horizontal row arrangement of QWERTY (FIG. 1). Hoke relocates all 26 letters of the alphabet from the location of the keys on the QWERTY (FIG. 1) keyboard; none of the letters retain their former positions. Hoke places 9 most used keys on the home row (to wit: AEHIONRST) and selects the vowel "U" for the 10th position. Hoke's features are to place most used keys on home rows, and to place Shift key, Back Spacer, and Shift lock in the vertical middle of the keyboard to be operated by the thumb.

1936 Typewriter Keyboard, U.S. Pat. No. 2,040,248 issued to AUGUST DVORAK et al. Dvorak introduced a new keyboard "based on the frequency of usage of the letters in the English language." (Of course, so was Shole's keyboard.) But by the 1930's, the electric typewriter solved the jamming problem of six decades earlier. Dvorak retains the horizontal row arrangement of QWERTY (FIG. 1). Dvorak relocates 23 letters of the 26 letters of the alphabet from their former location on the QWERTY (FIG. 1) keyboard; only 3 letters retain their former positions (to wit: AMZ). Dvorak places 9 most used keys on the home row (to wit: ADEHINOST) and selects the vowel "U" for the 10th position. Dvorak's features are to place most used keys on home rows (or middle bank) for 70% total letter frequency. Dvorak also reduces awkward positions which slow down rhythm and contribute to errors, fatigue, and slowness. He improves typing for digraphs (two letter sequences) and trigraphs (three letter sequences). ADEHINOSTU (Dvorak's Top 10) ("U" for "R". Dvorak's frequency list used the vowel "U for a home key instead of "R".) These ten letters combined have a cumulative percentile frequency in English of 69, in French of 72, in German of 67, in Italian of 69, and in Spanish of 64. The other 16 letters of the alphabet (BCFGJKLMPQRVWXYZ) have a cumulative percentile frequency in English of 31, in French of 28, in German of 33, in Italian of 31, and in Spanish of 36.

It is clear from the above that through the ages there have been a number of ways of transcribing the written word and in this century people have come up with a number of different keyboard arrangements to facilitate the written word. However, many millions of people have learned the "Obsolete" QWERTY (FIG. 1) keyboard. But, would they try a different arrangement? Dvorak changed the location of nearly all of the letters from Sholes's keyboard, and so, most people were not willing to try a totally new keyboard arrangement. Hence, the Dvorak keyboard has been largely ignored.

1937 Keyboard for Typewriters, U.S. Pat. No. 2,080,457 issued to R. Bower, assignor to Burroughs Adding Machine Company. Bower retains the 4 horizontal row arrangement of QWERTY (FIG. 1). Bower relocates 24 letters of the alphabet from their former location on the QWERTY (FIG. 1) keyboard; 2 letters retain their former positions (to wit: SH). Bower places 10 most used keys on the home row (to wit: ADEHINORST), for 71% total letter frequency. Bower's improvements reduce awkward positions, avoid rhythm slow down, reduce errors, fatigue, and increase speed. He improves typing for two and three letter combinations.

1940 Electric typewriters allow speeds to increase to 120 WORDS A MINUTE.

1965 Word Writing Machine Producing closed up printing in response to simultaneous actuation of keys, W. Ayres U.S. Pat. No. 3,225,883. Ayres abandons the QWERTY (FIG. 1) 4 horizontal row system for a 5 row grouping of double alphabets. The keyboard design allows simultaneous fingering instead of sequential fingering as on a typewriter. It is designed for a shorthand, or stenotype system.

1972 Keyboard for Typewriter, U.S. Pat. No. 3,698,532 issued to I. Dodds. Dodds adopts a 4 row angular arrangement of keys. Dodds relocates 24 letters of the alphabet from their former location on the QWERTY (FIG. 1) keyboard; 2 letters retain their former positions (to wit: AM). Dodds places the 9 most used keys on the home row (to wit: ADEHIONST) and selects the vowel "U" for the 10th position. The feature of the angle is to eliminate "cramping of the operator's hands, fingers and arms."

1972 Keyboard Arrangement, U.S. Pat. No. 3,698,533 issued to Illig, assigned to Bell Labs. Illig adopts a 5 row arrangement of keys. Illig relocates 26 letters of the alphabet from their former location on the QWERTY (FIG. 1) keyboard. The vowels are placed on the home row, with remaining letters arranged in order of frequency. The feature is to allow a single hand to operate the board.

1974 English Keyboard Scheme, U.S. Pat. No. 3,847,263 issued to X. X adopts the horizontal arrangement of QWERTY (FIG. 1). X relocates 24 letters of the alphabet from their former location on the QWERTY (FIG. 1) keyboard; 2 letters retain their former positions (to wit: HX). X places 9 most used keys on the home row (to wit: AEHIONRST) and selects the vowel "U" for the 10th position. The X feature is to place the vowels (AEIOU) on the same side, to be typed by one hand, with consonants on the other side of the home row, to be typed by the other hand.

1976 Syllabic Typewriter, U.S. Pat. No. 3,970,185 issued to D. Shelton. Shelton selects a 5 row arrangement and relocates all 26 letters of the alphabet from their former location on QWERTY (FIG. 1). The vowels are placed in the lower center to be operated by the thumbs.

1981 Keyboard Arrangement, U.S. Pat. No. 4,244,659 issued to L. Malt. Malt selects a 5 row arrangement in a curving pattern and relocates all 26 letters of the alphabet from their former location on QWERTY (FIG. 1). The most used keys (to wit: ANISDTHOR) are selected for the home row, and the E key is to be operated by the thumb.

1987 Combinatorial Keyboards Which Encode Characters and a Space, U.S. Pat. No. 4,655,621 issued to R. Holden. Holden selects a 2 row curved grouping of 18 keys. Holden relocates all 26 letters of the alphabet from their former location on QWERTY (FIG. 1). Holden uses principles of musical bassoon playing to allow the operator to select keys. Holden compares the letter frequency of the alphabet in the following languages: English, French, German, Italian and Spanish. The keyboard features minimal formal instruction, adaptability to other languages written in the Latin alphabet, increased speed, and lower error rate. Hoden allows operation by the thenar and hypothenar eminences (heels of the hands).

OBJECTS OF THE INVENTION

Thus, it is an object of the present invention to provide a keyboard arrangement that has the distinct advantage of maximizing the speed and efficiency of typing while allowing for a smooth and easy transition from the QWERTY (FIG. 1) keyboard arrangement to the keyboard arrangement of the present invention.

Another object of the present invention is to provide a keyboard that reduces flexing of the fingers and thereby reduces stretching of the tendons that reach from the finger to the elbow and thereby reduce the incidence of injury to the hand, wrist and forearm as a result of stresses induced from typing.

Yet another object of the present invention is to allow disabled, arthritic, and/or limited hand use typists, e.g., the disabled with limited finger movement, to increase their speed and use of the computer keyboard, and to reduce body, head, neck, eye, and sensory stress.

SUMMARY OF THE INVENTION

In accordance with the foregoing objectives, there is provided a computer keyboard having at least three rows of nine or more keys. The home row of the keyboard has at least three of the eight most used letters of the alphabet from a language which is capable of being written by the QWERTY (FIG. 1) keyboard. The upper row of the keyboard has at least three of the thirteen least used letters and the bottom row of the keyboard has at least four of the thirteen least used letters of the alphabet. The keyboard is also such that at least four and less than 26 of the keys have the same location as on the QWERTY (FIG. 1) keyboard.

In another preferred embodiment of the pressure invention there is provided a typing training system with an eye level display. The training system has a computer driven program having a display which has a sample text to be typed and a plurality of boxes which represent the characters of the keyboard in a configuration approximating that of the keyboard. The display enables the typist to see the location of the character to be typed in sequential order by an emphasis on the box corresponding to the key on the keyboard.

DETAILED DESCRIPTION OF THE INVENTION

Figure 2:
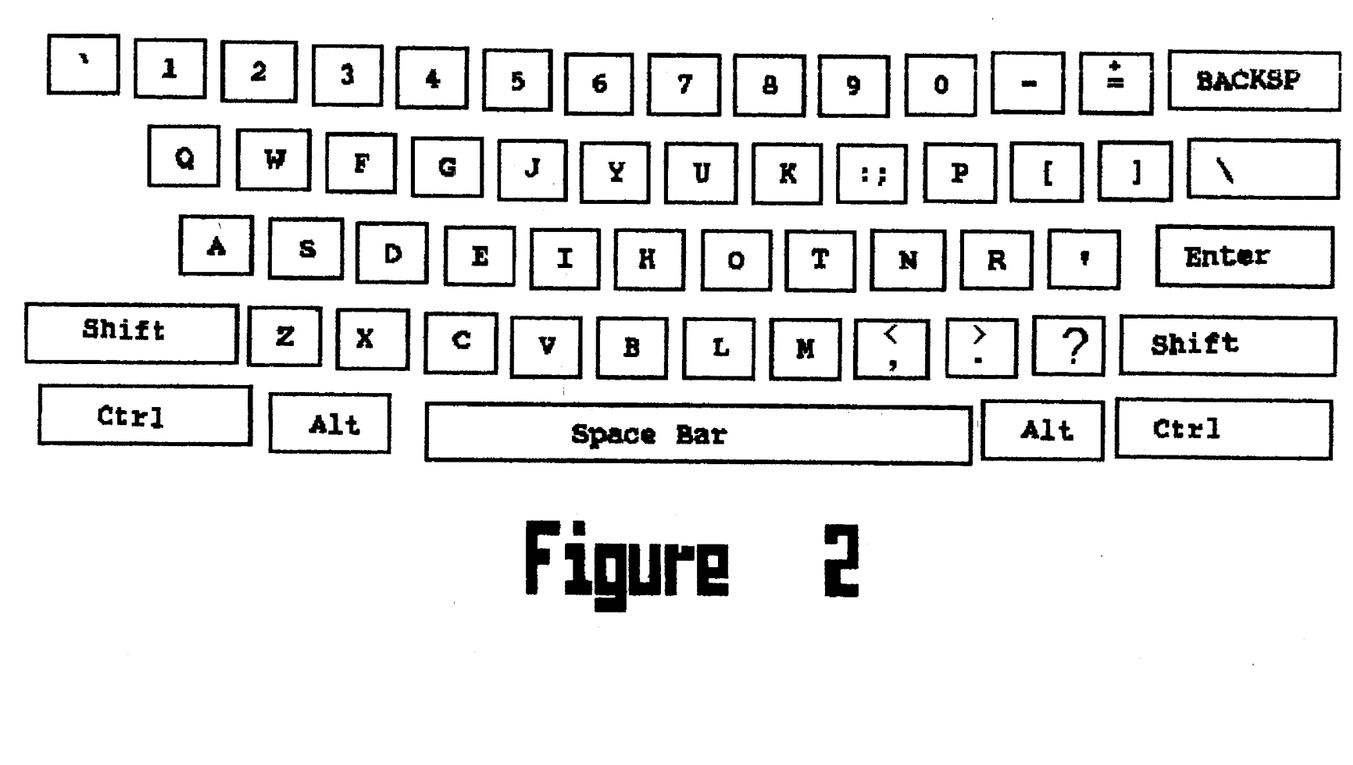
FIG. 2 is a plan view of a keyboard having the most used letters in the English language on the home row while maintaining the basic QWERTY format.

FIG. 2: ADEHINORST ("As in Red Hot") (These are the 10 most frequently used letters in American English.) These ten letters combined have a cumulative percentile frequency in English of 74, in French of 72, in German of 69, in Italian of 73, and in Spanish of 69. The other 16 letters of the alphabet (BCFGJKLMPQUVWXYZ) have a cumulative percentile frequency in English of 26, in French of 28, in German of 31, in Italian of 27, and in Spanish of 31. BCLMVXZ,.>?<(Bottom row for the "As in Red Hot" keyboard). FGJKPQUWY (Top row for "as in Red Hot" keyboard.)

Figure 3:
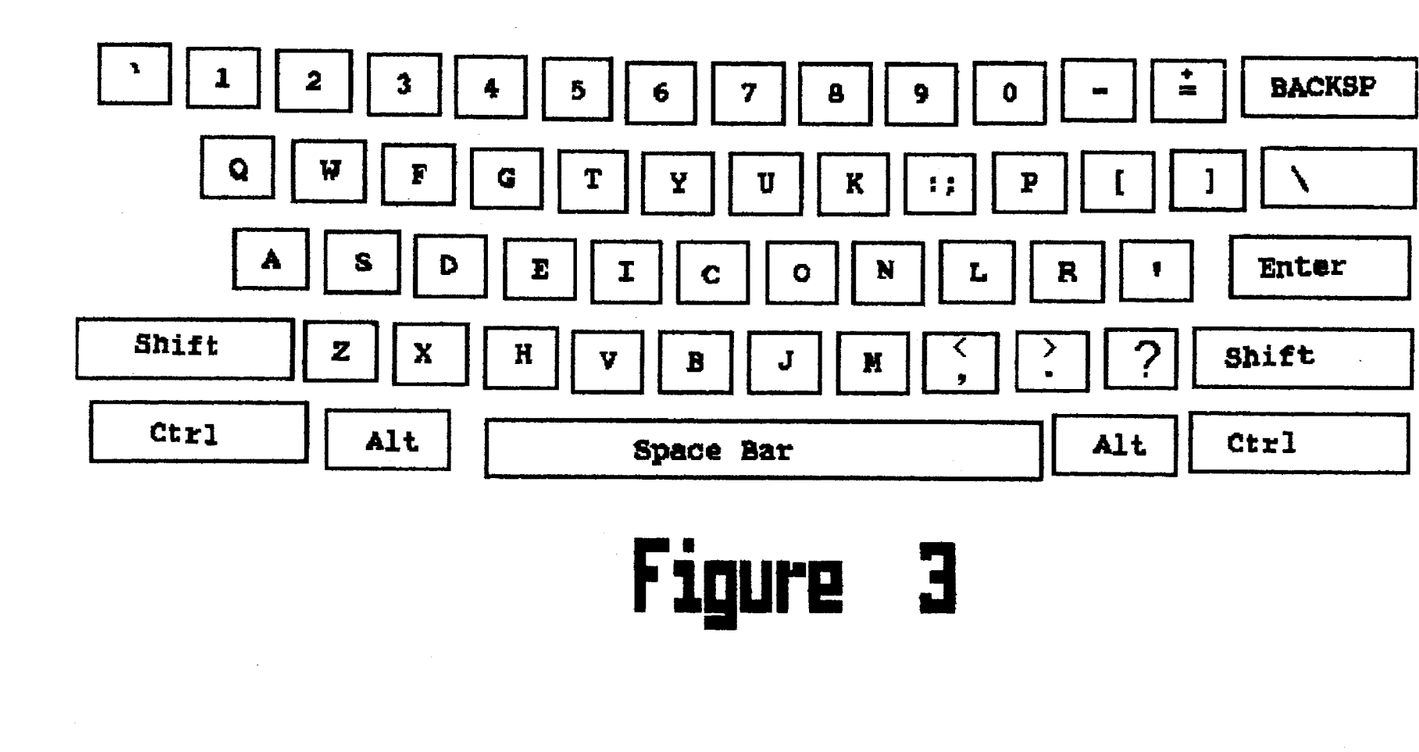
FIG. 3 is a plan view of a keyboard similar to FIG. 2 wherein the most used letters are specially adapted to the Spanish language.

FIG. 3 home row is ACDEILNORS (Best for Spanish.) (Substitutes "C" for "H" and "L" for "T". In Spanish the letter "T" is a seldom used letter.) These ten letters combined have a cumulative percentile frequency in English of 68, in French of 74, in German of 64, in Italian of 74, and in Spanish of 75. The other 16 letters of the alphabet (BFGHJKMPQTUVWXYZ) have a cumulative percentile frequency in English of 32, in French of 26, in German of 36, in Italian of 26, and in Spanish of 25. (This is useful for geography because of Spanish names in southern and western United States.)

Figure 4:
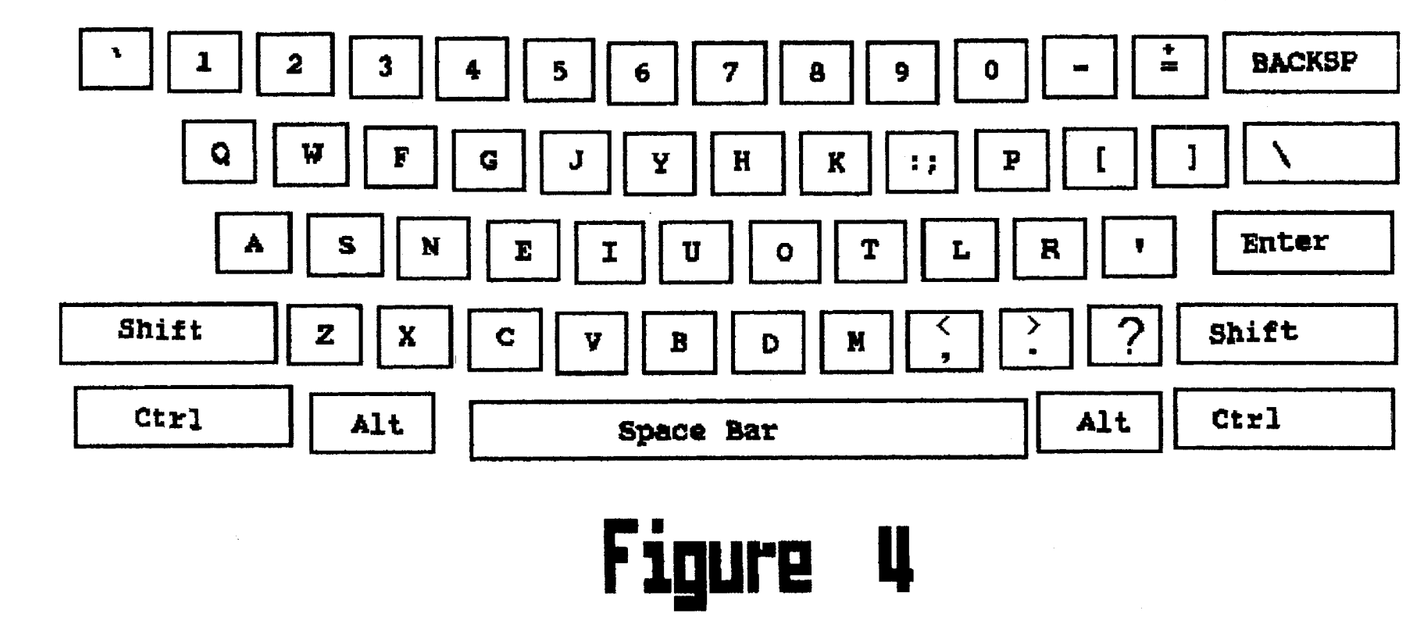
FIG. 4 is a plan view of a keyboard similar to FIG. 2 wherein the most used letters are specially adapted to the French language.

FIG. 4 shows a Home row of AEILNORSTU (Best for French.) (Substitutes "L" and "U" for "D" and "H".) These ten letters combined have a cumulative percentile frequency in English of 70, in French of 78, in German of 65, in Italian of 78, and in Spanish of 72. The other 16 letters of the alphabet (BCDFGHJKMPQVWXYZ) have a cumulative percentile frequency in English of 30, in French of 22, in German of 35, in Italian of 22, and in Spanish of 28. (Useful for diplomacy, cooking, microbiology subjects.)

Figure 5:
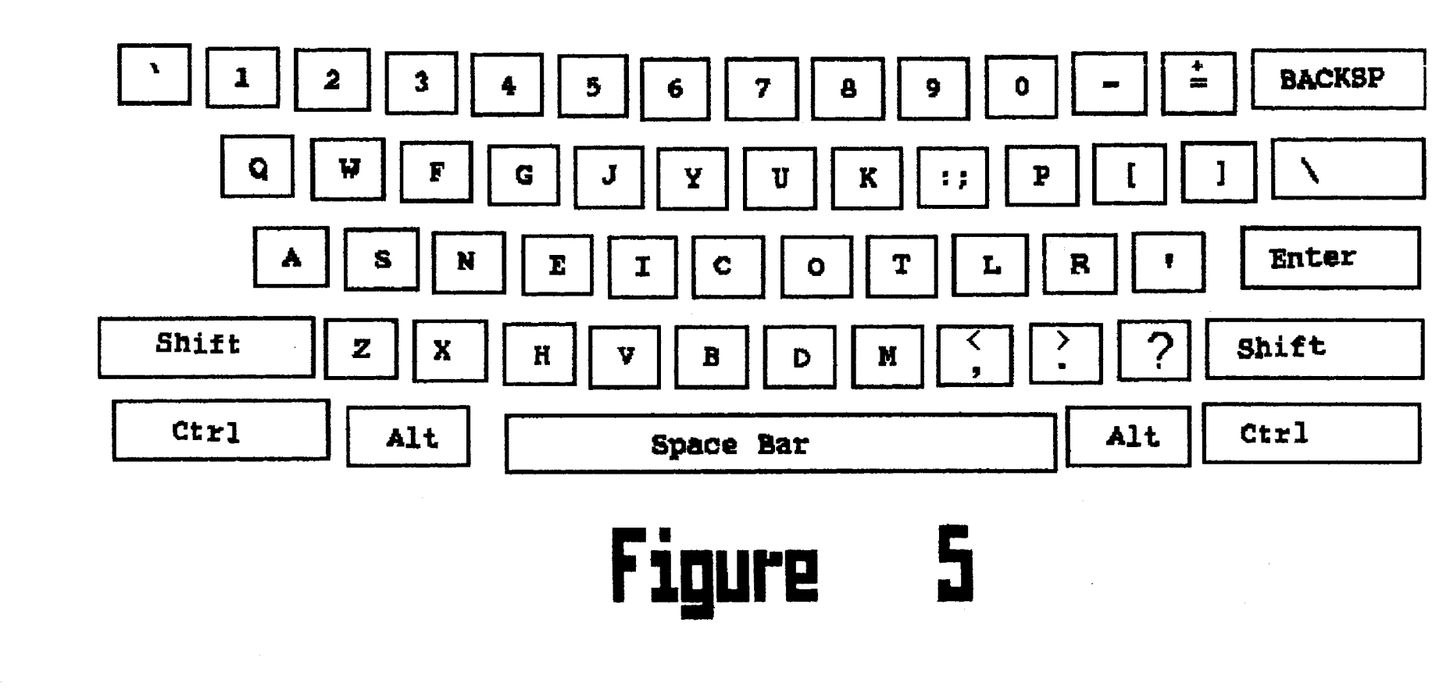
FIG. 5 is a plan view of a keyboard similar to FIG. 2 wherein the most used letters are specially adapted to the Italian language.

FIG. 5 shows a Home row of ACEILNORST (Best for Italian.) (Substitutes "L" and "C" for "D" and "H".) These ten letters combined have a cumulative percentile frequency in English of 73, in French of 76, in German of 65, in Italian of 78, and in Spanish of 73. The other 16 letters of the alphabet (BDFGHJKMPQUVWXYZ) have a cumulative percentile frequency in English of 27, in French of 24, in German of 35, in Italian of 22, and in Spanish of 27. (This is useful for Classical music, opera, and electrical sciences due to prominence of Italian origins.)

Figure 6:
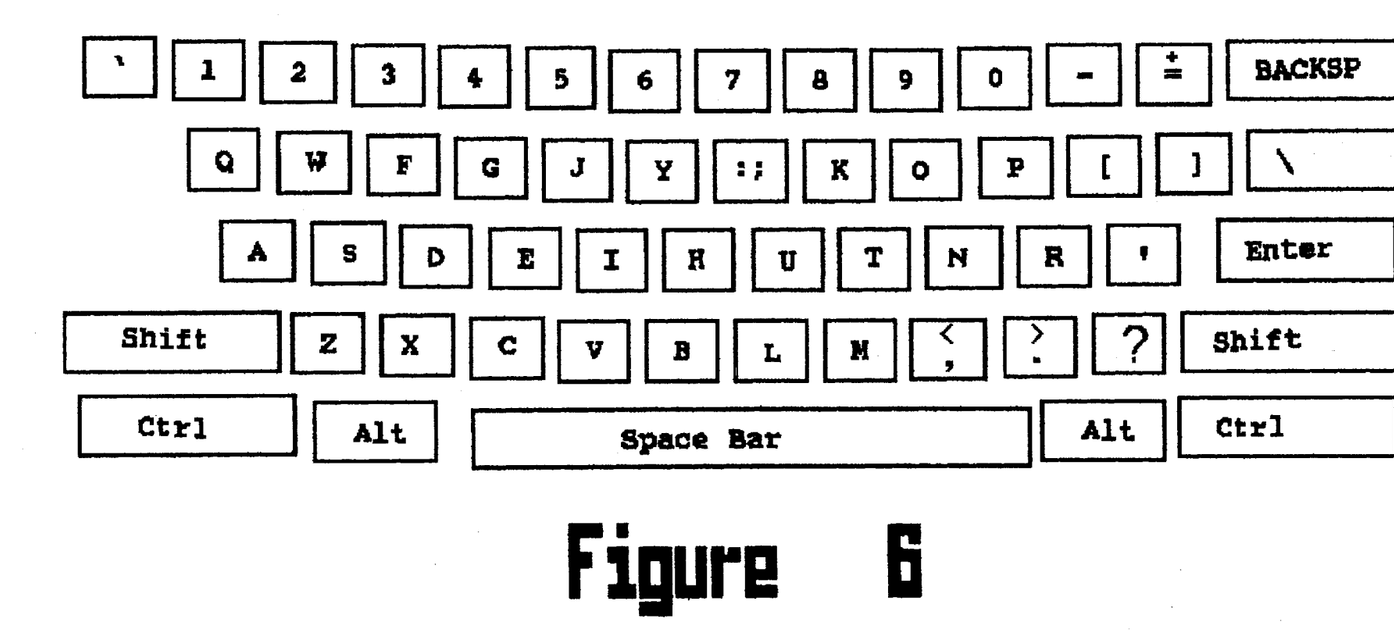
FIG. 6 is a plan view of a keyboard similar to FIG. 2 wherein the most used letters are specially adapted to the German language.
Figure 7:
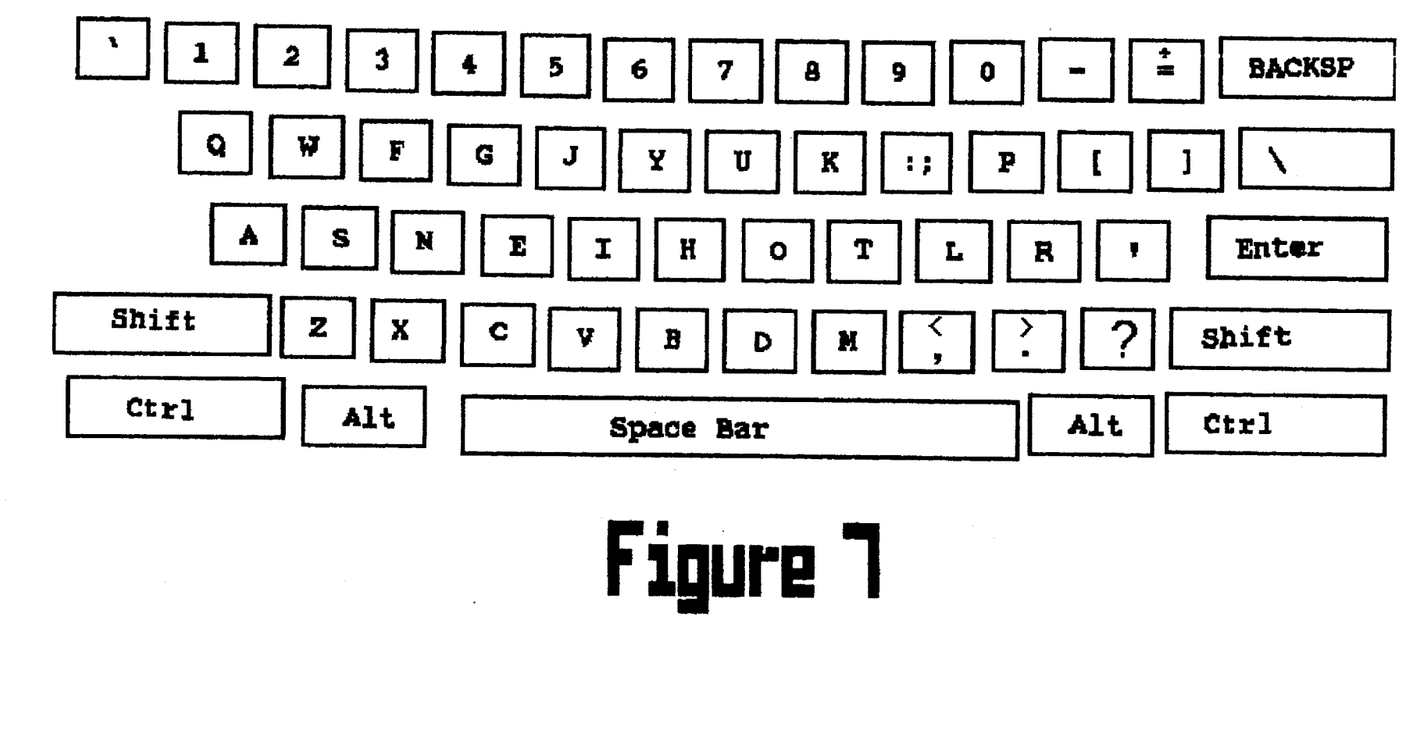
FIG. 7 is a plan view of a keyboard similar to FIG. 2.
Figure 8:
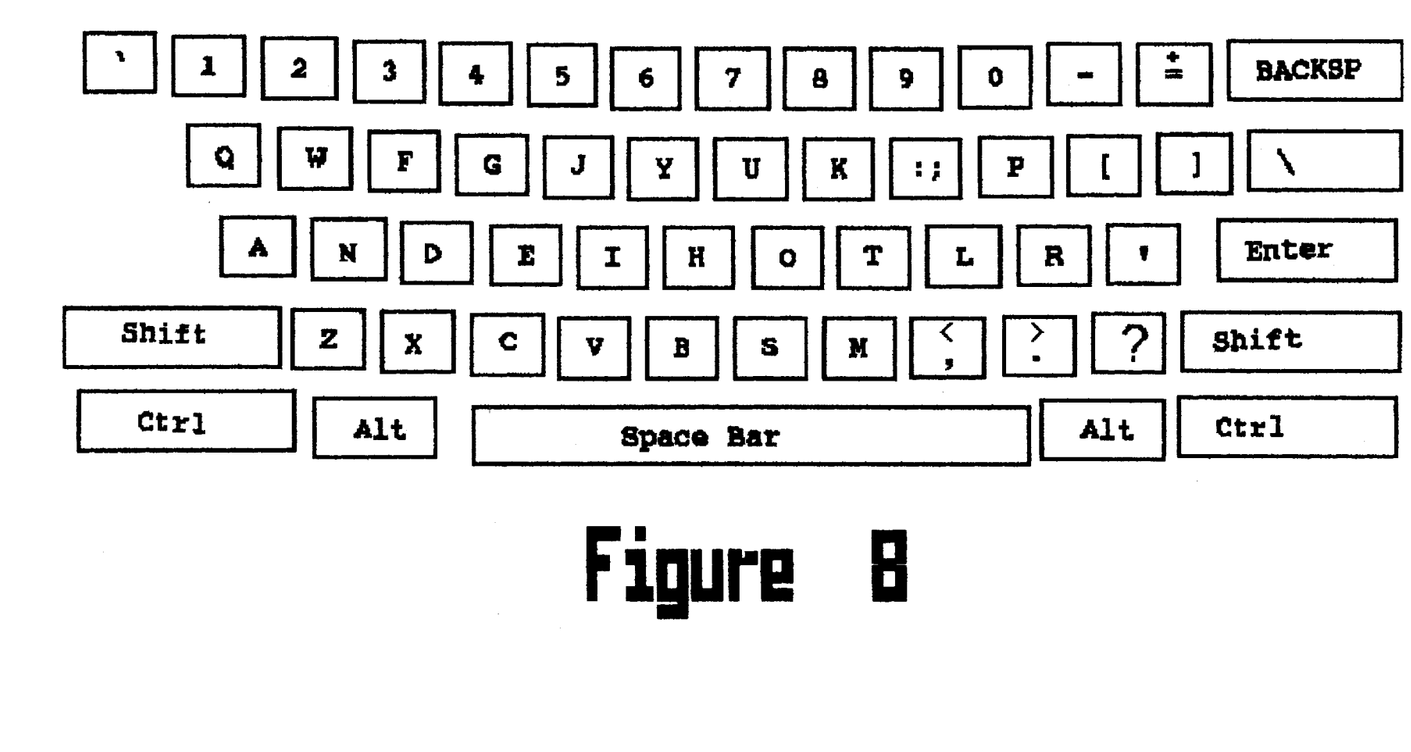
FIG. 8 is a plan view of a keyboard similar to FIG. 2.
Figure 9:
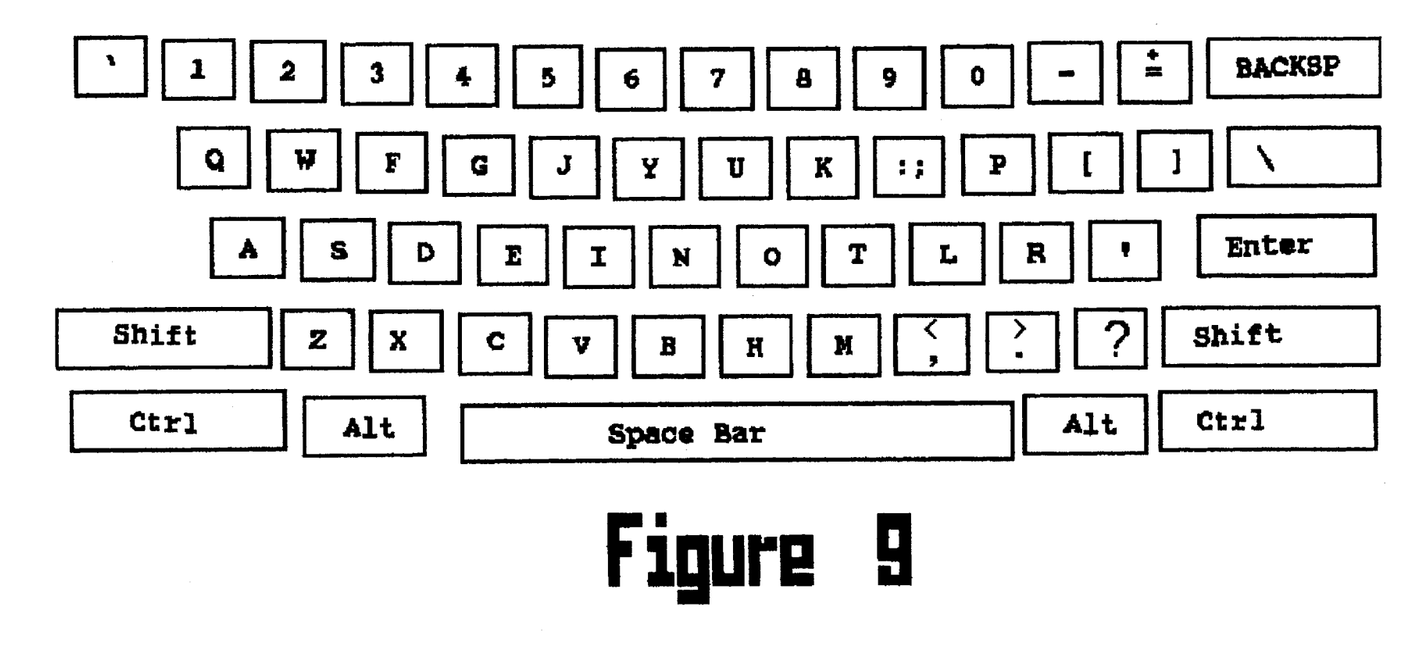
FIG. 9 is a plan view of a keyboard similar to FIG. 2.
Figure 10:
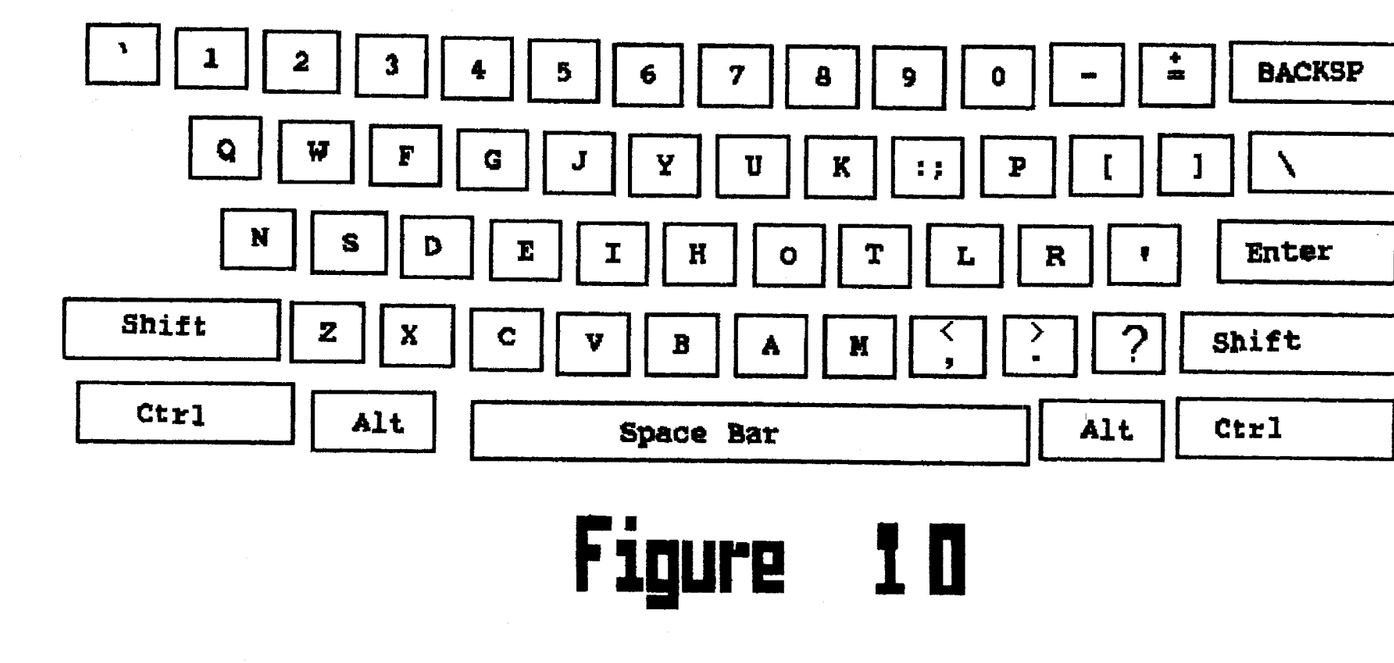
FIG. 10 is a plan view of a keyboard similar to FIG. 2.

FIG. 6 shows a Home Row of ADEHINRSTU (Best for German.) (Substitutes "U" for "O".) These ten letters combined have a cumulative percentile frequency in English of 69, in French of 71, in German of 72, in Italian of 64, and in Spanish of 63. The other 16 letters of the alphabet (BCFGJKLMOPQVWXYZ) have a cumulative percentile frequency in English of 31, in French of 29, in German of 28, in Italian of 36, and in Spanish of 37. (Useful for chemistry and Yiddish.)

FIG. 7–10 each show a keyboard similar to FIG. 2 having different combinations of the letters A, S, D, H, and L on the home row.

DESCRIPTION OF THE PREFERRED EMBODIMENT

It will also be appreciated that the above lists are merely exemplary of a number of the keyboard arrangements according to the present invention. Thus, the above lists are meant as samples of arrangements according to the present invention and are not meant to limit the scope of the many arrangements that are contemplated by the present invention.

Twenty years ago, the following was written: "One of the most important things about a typewriter is the arrangement of the letters on the keyboard. A typist becomes used to a certain arrangement, and if different machines had different arrangements it would be hard to use more than one particular make of machine. Yet in the early days there were many different arrangements. Gradually these came down to two popular ones, called the 'universal' and the 'obsolete.' Finally the 'obsolete' keyboard was adopted by all manufacturers."

"The 'obsolete' keyboard arrangement is:

|          | 1 2 3 4 5 6 7 8 9 0 |
|----------|---------------------|
|          | Q W E R T Y U I O P |
| Home Row | A S D F G H J K L ; |
|          | Z X C V B N M , .   |

"The problem in designing a typewriter keyboard is this: Some letters of the English language are used more often than others, and some combinations of letters are used more often than others. The keyboard should place the most-used letters where they are easiest to reach with the fingers, but it should separate the letters of the most-used combinations. For example, the combination TH is used a great deal (in such words as the, that, than, this, thing, and so on) while the combination TQ is never used. If the T key and the H key were too close together, the type bar for H would always be striking the type bar for T."

"Sholes, the inventor, worked out the 'obsolete' keyboard. It prevents most clashes between type bars, but in other ways it is very poor. The forefinger and middle finger of the hand are the ones we can use best, and the most-used letters should be where these fingers can reach them most easily, but on the 'obsolete' keyboard many of the most-used letters are at the sides where they are within easy reach of the little finger but not of the middle fingers."

"Many people have worked out better keyboard arrangements, but so many millions of people have learned the 'obsolete' keyboard that it would cause them a great deal of trouble if the arrangement were changed." Source: *Illustrated World Encyclopedia*, Vol 14, 1970, Glen Cove, N.Y., p. 4694 et seq.

The "As In Red Hot" (FIG. 2) keyboard has been learned by pre high school age students, and an adult male. The males were touch typists, both in QWERTY (FIG. 1), with the adult male also proficient in Dvorak. The As in Red Hot keyboard has been used in hundreds of hours of writing, and proved beneficial as a relaxed and easier to learn method of keying in data, and typing with reduced strain.

The "As in Red Hot" (FIG. 2) keyboard can be learned in about eight hours of typing.

In the 1980's, the Headquarters U.S. Air Force administrative offices at the Pentagon attempted to adopt Dvorak. However, due at least in part to the difficulty in learning the essentially "entirely new" Dvorak keyboard, the attempt was abandoned.

"As in Red Hot" (FIG. 2) is an anagram from the 10 particularly preferred home row keys according to the invention, i.e., A, S, I, N, R, E, D, H, O, and T.

"Carpel Tunnel syndrome" refers to the compression of the median nerve (due to inflammation of flexor retinaculum, arthritis, or tenosynovitis) as it passes through the osteofibrous carpal tunnel along with the tendons of the long digital muscles which typically results in paresthesia (tingling), anesthesia (loss of tactile sensation), or hypesthesia (diminished sensation) in skin areas related to the thumb, index, middle, and lateral ½ of ring fingers. The palm may be saved due to palmar cutaneous branch arising superficial to flexor retinaculum. A progressive loss of strength and coordination in thumb with diminished use of thumb, index, and middle fingers as nerve is compressed is also common. Carpal Tunnel syndrome is relieved by partial or complete division of the flexor retinaculum."

"Finger Distance" as Calculated on 100,000 keystrokes: A typist who averages 40 words per minute will make 100,000 keystrokes in an 8 and a third hour day (8 hours and 20 minutes). With this definition in mind, the following list compares distances based on the QWERTY (FIG. 1) Keyboard and the "As in Red Hot" (FIG. 2) keyboard. The far left column lists the letters of the alphabet and the average number of times each will be touched out of 100,000 keystrokes. The middle column lists the distance in yards that the fingers will travel to depress the keys on the "As in Red Hot" (FIG. 2) keyboard. The far right column lists the distance in yards that the fingers will travel to depress the keys on the QWERTY (FIG. 1) keyboard.

TABLE 1

Table of distances

| Key | Keystrokes | "As in Red Hot" | QWERTY |
|---|---|---|---|
| E | 13,000 | 0 | 361.1 yds |
| T | 9,000 | 0 | 250 yds |
| A | 8,000 | 0 | 0 |
| O | 8,000 | 0 | 222.2 yds |
| N | 7,000 | 0 | 194.4 yds |
| I | 6,500 | 180.5 yds | 180.5 yds |
| R | 6,500 | 0 | 180.5 yds |
| S | 6,000 | 0 | 0 |
| H | 6,000 | 166.6 yds | 166.6 yds |
| D | 3,000 | 0 | 0 |
| W,Y,U,P,C,V,B,M | 19,100 | 530.5 yds | 530.5 yds |
| F,G,L | 6,900 | 191.6 yds | 63.9 yds |
| J,K,Q,X,Z | 1,000 | 27.7 yds | 13.8 yds |
| TOTAL | 100,000 | 1096.9 yds | 2163.5 yds |

Finger distance is how far it moves forward or backward, before the downward compression of the key; then the finger merely presses down, to generate a character or impression.

A "finger foot" is 1 foot, traveled by fingers, one half inch at a time.

A "finger football field" is 100 yards, traveled by fingers, one half inch at a time, up and back, for a round trip of one inch. 100 yards is the length of a football field. Hence the name "finger football field", or just "finger field".

A "finger mile" is 1 mile, traveled by fingers, one half inch at a time.

Finger numbers—left hand little (1), ring (2), middle (3), index (4); right hand index (5), middle (6), ring (7), and little (8).

Cumulative frequency refers to the most used letters, i.e., the letters used most often, in a particular language such as English, Spanish, German, French, Italian, etc. This is an important methodology in cryptography (i.e. decoding messages).

The frequency of single letters in the English language, in descending order, according to Laurence Dwight Smith, *Cryptography*, 1943, New York, Dover Publications is as follows: "E, T, O, A, N, I, R, S, H, D, L, C, W, U, M, F, Y, G, P, B, V, K, X, Q, J and Z."

The frequency of single letters in newspaper English language, in descending order, from Donald Milliken, *Elementary Cryptography and Cryptanalysis*, 1942, New York University Bookstore is as follows: E, T, N, R, O, I, A, S, D, H, L, C, F, U, P, M, Y, G, W, V, B, X, K, Q, J and Z. More specifically, the percentages were as follows: E—13%, T—9.3%, N—7.8%, R—7.7%, O—7.4%, I—7.4%, A—7.3%, S—6.3%, D—4.4%, H—3.5%, L—3.5%, C—3.0%, F—2.8%, U—2.7%, P—2.7%, M—2.5%, Y—1.9%, G—1.6%, W—1.6%, V—1.3%, B—0.9%, X—0.5%, K—0.3%, Q—0.3%, J—0.2%, and Z—0.1%.

Thus, by relocating keys so as to maximize frequency on the home row, one can achieve a cumulative frequency of upwards of 80% or more depending upon the particular words that are employed. In fact, it will be appreciated that if desired, one could use only the home row keys and still communicate effectively thereby achieving a home row cumulative frequency of 100%. For example, one technique frequently employed for encryption is to use only a select number of letters, e.g., 10, as the entire alphabet. Accordingly, by the term "a cumulative frequency of about 80% (or 40%)" it is not meant to refer strictly to 80% (or 40%), per se, but rather 80% (or 40%) for the "normal usage" of the full alphabet, e.g., 26 letters for English, French, Spanish, etc. However, it is also understood that this percentage can be varied as desired by, e.g., usage of fewer than the full alphabet or through a particular word selection.

High frequency keys refers to those letters of the alphabet used most in normal usage of a language. These letters provide cryptographers with clues for decoding secret messages.

Home Row—the keys on the middle row (i.e. middle bank) of keys (also the resting place of the fingertips of the two hands, index, middle, ring, and little fingers).

"jam v. t. (jammed, jam'ming) 1, thrust or squeeze in so as to stick fast; crowd so as to hinder motion or extrication.—v. i. 1, become wedged in place." WEBSTER HANDY College DICTIONARY, 1981.

Low Frequency keys—The letters of the alphabet that are little used.

"ob'so-lete" adj. gone out of use; out of date." WEBSTER HANDY College DICTIONARY, 1981. aka QWERTY (FIG. 1) keyboard.

Psychokinetic—the typist has memorized the keyboard so thoroughly as to type without looking at the board, usually using all fingers, each finger on a particular group of keys.

QWERTY (FIG. 1)—a nickname name given to C. Latham Sholes "standard" keyboard; it is an anagram from the first six letters of the top alphabet row. It is the "slow" board, because slowness prevented the type bars from clashing, and that was good in 1872. It is the "weary" board, because these wasted motions weary the fingers and arms of typists. It is now the "obsolete" or "primitive" keyboard, because its purpose has passed.

Row means a horizontal row or bank of keys on the keyboard, between nine and fifteen in number, each row arranged in parallel.

"stan'dard, n, 1, a basis of comparison; a criterion; measure." WEBSTER HANDY College DICTIONARY, 1981. aka QWERTY (FIG. 1) Keyboard.

Universal keyboard—aka QWERTY (FIG. 1).

By "eye level view" or "eye level display" it is understood that the display is projected on a screen so that the user need not glance down at their fingers and/or the keys while typing.

In a particularly preferred embodiment of the present invention, twelve keys are moved from the "obsolete" keyboard to create the "As in Red Hot" (FIG. 2) keyboard. The moved keys are: E-F-G-I-J-K-L-N-O-R-T and (;) semicolon. E, R, T, O, and I, formerly on the top row of the "obsolete" keyboard, are letters most used and should be placed on the home row, where they can be typed easily. The letter N, formerly on the bottom row of the "obsolete" board. N, too, should be placed on the home row. In order to place the useful letters on the home row, F, G, J, L, K, and; were swapped with the most used keys. This results in the "As in Red Hot" (FIG. 2) keyboard.

The letters E-I-O-N-R-T, (listed alphabetically) are the highest frequency letters in Modern English. They make up about 50 percent of our words. All of these are on the home row according to one preferred embodiment of the present invention. These keys are also on the home row for the "As in Red Hot" (FIG. 2) Keyboard whereas none are on the home row of the QWERTY (FIG. 1) keyboard.

According to some books on codes, to wit: *All Kinds of Codes*, by Babson, New York: Four Winds Press, 1976, p. 54–607; *Cryptography*, by Laurence Dwight Smith, 1943, New York, Dover Publications; *Elementary Cryptography and Cryptanalysis*, by Donald D. Milliken, New York University Bookstore, 1942 we learn the following:

On the average, in written English, "E" shows up about 13 percent of the time; "T"—nine percent; "O"—eight percent; "N"—seven percent; "R" and "T"—six and a half percent each. (All of these may be on the home row of the keyboard according to the present invention. None are on the Obsolete keyboard home row.)

The most often used two-letter English words (with the "As in Red Hot" (FIG. 2) finger assignments) are: AS(12), AT(16), BE(44), BY(45), DO(35), HE(54), IN(47), IS(42), IT(46), OF(53), ON(57), OR(58), SO(25), and TO(65). (Up to at least 11 of the 14 may be on the home row of the keyboard according to the present invention. That is, 11 of these words can be spelled solely from the letters of the home row. Only 1 is on the QWERTY (FIG. 1) keyboard home row.) Most often used of these two-letter words are: OF(53), TO(65), IN(47). (Up to at least 2 of the 3 may be on the home row of the keyboard of the present invention. None are on the QWERTY (FIG. 1) keyboard home row.)

The most often used three-letter English words (with the "As in Red Hot" (FIG. 2) finger assignments) are: ALL(155), AND(173), ANY(175), ARE(184), BUT(456), CAN(317), FOR(358), NOT(756), THE(654), and YOU(555). (Up to at least 4 of the 10 may be on the home row of the keyboard of this invention. Only 1 is on the QWERTY (FIG. 1) home row.) Most often used of these are AND and THE. (Both may be on the home row of the keyboard of this invention. Neither are on the QWERTY (FIG. 1) keyboard home row.)

Every English word has at least one of these letters: A-E-I-O-U-Y. (Up to at least 4 of the 6 may be on the home row of the keyboard of this invention. Only 1 is on the QWERTY (FIG. 1) keyboard home row.)

Over half of our English words begin with: A-C-H-O-S-T-W. (Up to at least 5 of the 7 may be on the home row of the keyboard of this invention. Only 3 are on the QWERTY (FIG. 1) keyboard home row.) T, the most common beginning letter, may be on the home row of the keyboard of this invention, but it is not on the QWERTY (FIG. 1) keyboard home row.)

Because of their frequent use, the letters E-T-A-O-N-I-R and S are on most lists of eight most common English letters. When maximizing the frequency of usage on the home row, we must look for 10 letters (5 for each hand) for a home row, differences arise for spots 9 and 10. Should the top 10 spots included "H" or "L"? "C" or "D"? "U" or "Y"? Because Sholes put A-S-D-H and L on the home row, these are candidates for retention in the top ten. These are candidates for retention because it is important to make as few changes from the QWERTY (FIG. 1) keyboard as possible so that everyone who is presently accustomed to the QWERTY (FIG. 1) keyboard may switch to the keyboard of this invention with a minimum amount of work and memorization. A and S are clearly required. D, H and L are better candidates than C, U and Y which are not on the home row of the Obsolete keyboard. It makes little difference whether one of either D, H or L is dropped off the home row to make room for the 6 most used letters E-I-O-T-N-R. Thus, for example, the keyboard can keep D and H and move L to the bottom row in which case the keyboard might appear as in Lists 1, 2, and 3, below.

The present invention has as an advantage the reduction of the human cost of the 1872 technology currently employed in most keyboards. For example, a 40 word per minute typist will make 200 keystrokes a minute, 12,000 an hour, or 100,000 in an 8⅓ hour day. On the obsolete keyboard, the fingers will have traveled 1,000 yards more than, e.g., the "As in Red Hot" (FIG. 2) keyboard (using conversational English). In other words, the "As in Red Hot" (FIG. 2) keyboard allows the fingers of a 40 word per minute typist to shorten their work or travel by 10 "finger football fields" a day.

Similarly, the "As in Red Hot" (FIG. 2) keyboard allows fingers of an 80 word per minute typist to shorten work by 2,100 yards per day, or 21 "football finger fields". In a weeks time, that is 105 "finger fields", or nearly 6 "finger miles". In a year, the typist's fingers have traveled 300 "finger miles" farther on QWERTY (FIG. 1). That is 3,000 miles in a decade, or a "finger United States".

The obsolete keyboard can even create an occupational hazard known as repetitive stress disorder. One manifestation is a medical disability termed "Carpal Tunnel Syndrome," which is a wrist injury.

Thus, an additional advantage of the present invention is the protection of the carpals from stress injury. The carpals are 8 wrist bones. These are 17 tendons in the wrist. Tenosynovitis is an inflammation of the tendon sheaths. There are 9 major nerves, arteries and veins in the wrist. There are also several sheaths and ligaments in the wrist. By reducing the amount of stress and work that the fingers, hands, wrists, etc. must perform during typing, the present invention can drastically reduce the incidence of injury associated with typing using the QWERTY (FIG. 1) keyboard.

Additionally, the present invention also has the advantage of rearranging the training keyboard to accommodate the disabled or one handed typist, who should want a home row of the 6 most used keys, that is E, T, A, O, N, and I, or R.

The present invention also has the unique advantage of accommodating the habits learned on QWERTY (FIG. 1) keyboard. For example, it is possible to switch just one letter, e.g., "E" for ";", and substantially increase the cumulative frequency of the home row. Similarly, if a very high cumulative frequency on the home row is desired with a minimum of rearrangement of the QWERTY (FIG. 1) keyboard, the "As in Red Hot" (FIG. 2) keyboard is highly advantageous. In particular, the "As in Red Hot" (FIG. 2) keyboard places frequently used keys on the home row, with little difference from the "QWERTY" keyboard. For the QWERTY (FIG. 1) proficient typist, "As in Red Hot" (FIG. 2) retains the location of 15 QWERTY (FIG. 1) keys, compared to, e.g., the Dvorak keyboard which retains only 3 QWERTY (FIG. 1) keys. Quite surprisingly, this makes the "As in Red Hot" (FIG. 2) keyboard arrangement five times easier to learn than the Dvorak keyboard. This advantage cannot be understated considering the inherent unwillingness of most people to "relearn" how to type on a new keyboard once they have become proficient on the QWERTY (FIG. 1) keyboard.

The keyboard of the present invention is surprisingly user friendly. Recognizing that millions of people have learned the obsolete board, only those keys were changed which were needed to place the most used keys on the home row. For example, the "As in Red Hot" (FIG. 2) keyboard appears as follows:

|  | 1 2 3 4 5 6 7 8 9 0 |
|---|---|
|  | Q W F G J Y U K : P |
| Home Row | A S D E H O T N R |
|  | Z X C V B L M , . |

In contrast, the QWERTY (FIG. 1) keyboard arrangement appears as follows:

|  | 1 2 3 4 5 6 7 8 9 0 |
|---|---|
|  | Q W E R T Y U I O P |
| Home Row | A S D F G H J K L ; |
|  | Z X C V B N M , . |

The present invention also provides a training system having a video display at the eye level of the user. The display is projected on the screen, e.g., cathode ray tube, television screen, liquid crystal display, monitor or the like. The eye level view allows the user to not look at the fingers or keys for guidance. This saves the time of looking down away from the material, referring to the keyboard to locate every letter as the typist practices the samples of letters and articles.

The display includes over 40 boxes to represent keys found on most keyboards, such as the 26 letter alphabet in 3 rows (abcdefghijklmnopqrstuvwxyz), and arabic numerals in a 4th row (1234567890), plus space bar, tab, control, and alternate key.

The display is user friendly in that it has additional useful information. The information can be seen by touching a function key which is identified in a helping menu. The menu allows the creation of custom keyboards. These custom keyboards can be changed by relocating with each of the letters of the alphabet. If a typist is missing the use of any fingers, the home keys can be arranged to place the most useful letters (E-T-A-O-N-I-R) where they can be reached by the useable fingers.

The display shows three lines of text for copying. The text scrolls (or changes) with the entry of the letters by the typist. Errors (depressing the wrong key out of order) are noted with an audible tone (the computer makes a noise.) The next letter to be typed is emphasized (e.g., a bold box in the example, but a bold letter, a different color, a flashing or moving letter, underlined or overlined, cursor marked, enlarged or reduced, bracketed, slanted, narrowed or fattened, etc.)

The system monitors data entry speed (typing speed) and reports it to the student, or proctor. The system can also monitor typing errors.

Sample texts are stored with the system to serve as textual data for the typist trainee to copy. The system can work with monochrome or color monitors.

Using the typing training system according to the present invention, it takes only about 8 hours to learn, for example, the "As in Red Hot" (FIG. 2) keyboard arrangement if the typist is already familiar with QWERTY (FIG. 1) keyboard. R. Holden U.S. Pat. No. 4,655,621 issued in 1987, at column 2 indicates that QWERTY (FIG. 1) takes 60 hours of class training to learn. This is about 180,000 keystrokes (assuming 10 words per minute). The learning is controlled by the letters typed least frequently, to wit: z (0.1%); j (0.2%); q (0.3%); k (0.3%); and x (0.5%). In 180,000 keystrokes, those letters are keyed as follows: z 180 keystrokes, j 360 keystrokes, and q and k 540 keystrokes each. But the location of z, q, and x do not need to be practiced, as they have not moved from QWERTY (FIG. 1) to, e.g., "As in Red Hot" (FIG. 2). And, because the most used keys are on the home row, fingers may depress keys with half the effort than before.

It will be noted that the keyboard arrangements of the present invention have been described above primarily in terms of the "As in Red Hot" (FIG. 2) arrangement as it beautifully exemplifies the unique advantages of the many arrangements possible according to the invention. However, there are an entire host of arrangements that are also possible according to this invention.

For example, the figures show letter combination sets. These are sets for the home row. The letter sets are selected from the 10 letter sets of the most often used letters in the Indo European languages. It will be appreciated by the skilled artisan that if one wishes to reconfigure the keyboard, using the lists as a guide, begin with the QWERTY (FIG. 1) layout.

Likewise, if the work processing entry is in a language other than English, the letter frequency changes with the language. And, as the present invention also contemplates arrangements that increase cumulative frequency on the home row for typists of all languages, the letter frequencies of other common languages, e.g., English, French, German, Italian, and Spanish, are compared in the Detailed Description of the Invention.

I claim:

1. A keyboard having, a complete alphabet, in at least three rows, each row having nine or more keys; comprising:

a home row having the keys corresponding to the letters E, T, A, O, N, I, R, and S; wherein at least two of the keys corresponding to the letters A, S, D, H and L, have the same location as in the home row of the conventional QWERTY keyboard;

an upper row, adjacent to said home row, having at least four keys corresponding to the letters selected from the group consisting of Q, W, Y, U, and P; at least three keys corresponding to the letters selected from the group consisting of F, G, J, K and the key corresponding to the semicolon and colon; wherein at least four of the keys corresponding to the letters Q, W, Y, U, and P have the same location as in the upper row of the QWERTY keyboard; and a lower row, adjacent to said home row, having at least three of the keys corresponding to the letters selected from the group consisting of C, V, B, and M; at least two keys corresponding to the letters selected from the group consisting of Z, X, and L; at least two keys corresponding to the punctuation marks selected from the group consisting of the period, the comma, and the question mark; wherein at least five of the selected keys selected from the group consisting of C, V, B, M, Z, X, period, comma, and question mark have the same location as in the lower row of the QWERTY keyboard.

2. A keyboard having, a complete alphabet, in at least three rows, each row having nine or more keys; comprising:

a home row having the key corresponding to the letter E; wherein at least two of the remaining keys, selected from the group consisting of the letters A, S, D, H and L, have the same location as in the home row of the conventional QWERTY keyboard;

an upper row, adjacent to said home row; having at least four keys corresponding to the letters selected from the group consisting of the letters Q, W, T, Y, U, O and P; wherein at least four of the keys corresponding to the letters Q, W, T, Y, U, O, and P have the same location as in the upper row of the QWERTY keyboard; and a lower row, adjacent to said home row, having at least five keys corresponding to the letters selected from the group consisting of Z, X, C, V, B, N, M, the period, the comma, and the question mark; wherein at least five of the selected keys have the same location as in the lower row of the QWERTY keyboard.

3. The keyboard of claim 2, further comprising:

the home row having keys corresponding to the letters E and T;

the upper row, adjacent to said home row; having at least four keys corresponding to the letters selected from the group consisting of the letters Q, W, Y, U, O and P, wherein at least four of the keys corresponding to the letters Q, W, Y, U, O, and P have the same location as in the upper row of the QWERTY keyboard.

4. The keyboard of claim 2, further comprising:

the home row having keys corresponding to the letters E, T and O;

the upper row, adjacent to said home row; having at least four keys corresponding to the letters selected from the group consisting of the letters Q, W, Y, U, and P, wherein at least four of the keys corresponding to the letters Q, W, Y, U, and P have the same location as in the upper row of the QWERTY keyboard.

5. The keyboard of claim 2, further comprising:

the home row having keys corresponding to the letters E, T, O and R;

the upper row, adjacent to said home row; having at least four keys corresponding to the letters selected from the group consisting of the letters Q, W, Y, U, and P, wherein at least four of the keys corresponding to the letters Q, W, Y, U, and P have the same location as in the upper row of the QWERTY keyboard.

6. The keyboard of claim 2, further comprising:

the home row having keys corresponding to the letters E, I, and R;

the upper row, adjacent to said home row; having at least four keys corresponding to the letters selected from the group consisting of the letters Q, W, Y, U, and P, wherein at least four of the keys corresponding to the letters Q, W, Y, U, and P have the same location as in the upper row of the QWERTY keyboard.

7. The keyboard of claim 2, further comprising:

the home row having keys corresponding to the letters E, I, R and N;

the upper row, adjacent to said home row; having at least four keys corresponding to the letters selected from the group consisting of the letters Q, W, Y, U, and P, wherein at least four of the keys corresponding to the letters Q, W, Y, U, and P have the same location as in the upper row of the QWERTY keyboard; and the lower row, adjacent to said home row, having at least five keys corresponding to the letters selected from the group consisting of Z, X, C, V, B, M, the period, the comma, and the question mark; wherein at least five of the selected keys have the same location as in the lower row of the QWERTY keyboard.

8. The keyboard of claim 2, further comprising:

the home row having keys corresponding to the letters E, T, O, I, R and N, the upper row, adjacent to said home row, having at least four keys corresponding to the letters selected from the group consisting of the letters Q, W, Y, U, and P, wherein at least four of the keys corresponding to the letters Q, W, Y, U, and P have the same location as in the upper row of the QWERTY keyboard; and the lower row, adjacent to said home row, having at least five keys corresponding to the letters selected from the group consisting of Z, X, C, V, B, M, the period, the comma, and the question mark; wherein at least five of the selected keys have the same location as in the lower row of the QWERTY keyboard.

9. The keyboard of claim 2, further comprising:

wherein at least three of the remaining keys, selected from the group consisting of the letters A, S, D, H and L, have the same location as in the home row of the conventional QWERTY keyboard.

10. The keyboard of claim 2, further comprising:

wherein at least four of the remaining keys, selected from the group consisting of the letters A, S, D, H and L, have the same location as in the home row of a conventional QWERTY keyboard.

11. The keyboard of claim 2, further comprising:

wherein at least four of the remaining keys, selected from the group consisting of the letters A, S, D, H and L, have the same location as in the home row of the conventional QWERTY keyboard;

the upper row, adjacent to said home row; having at least five keys corresponding to the letters selected from the group consisting of the letters Q, W, T, Y, U, O and P; wherein at least five of the keys corresponding to the letters Q, W, T, Y, U, O, and P have the same location as in the upper row of the QWERTY keyboard; and the lower row, adjacent to said home row, having at least seven keys corresponding to the letters selected from the group consisting of Z, X, C, V, B, N, M, the period, the comma, and the question mark; wherein at least seven of the selected keys have the same location as in the lower row of the QWERTY keyboard.

12. The keyboard of claim 2, further comprising:

the home row having keys corresponding to the letters E and T; wherein at least four of the remaining keys, selected from the group consisting of the letters A, S, D, H and L, have the same location as in the home row of the conventional QWERTY keyboard;

the upper row, adjacent to said home row; having at least four keys corresponding to the letters selected from the group consisting of the letters Q, W, Y, U, O and P, wherein at least four of the keys corresponding to the letters Q, W, Y, U, O, and P have the same location as in the upper row of the QWERTY keyboard; and the lower row, having at least seven keys corresponding to the letters selected from the group consisting of Z, X, C, V, B, N, M, the period, the comma, and the question mark; wherein at least seven of the selected keys have the same location as in the lower row of the QWERTY keyboard.

13. The keyboard of claim 2 further comprising:

the home row having keys corresponding to the letters E, T and O; wherein at least four of the remaining keys, selected from the group consisting of the letters A, S, D, H and L, have the same location as in the home row of the conventional QWERTY keyboard;

the upper row, adjacent to said home row; having at least four keys corresponding to the letters selected from the group consisting of the letters Q, W, Y, U, and P, wherein at least four of the keys corresponding to the letters Q, W, Y, U, and P have the same location as in the upper row of the QWERTY keyboard; and the lower row, having at least seven keys corresponding to the letters selected from the group consisting of Z, X, C, V, B, N, M, the period, the comma, and the question mark; wherein at least seven of the selected keys have the same location as in the lower row of the QWERTY keyboard.

14. The keyboard of claim 2, further comprising:

the home row having keys corresponding to the letters E, T, O and R; wherein at least four of the remaining keys, selected from the group consisting of the letters A, S, D, H and L, have the same location as in the home row of the conventional QWERTY keyboard;

the upper row, adjacent to said home row; having at least four keys corresponding to the letters selected from the group consisting of the letters Q, W, Y, U, and P, wherein at least four of the keys corresponding to the letters Q, W, Y, U, and P have the same location as in the upper row of the QWERTY keyboard; and the lower row, having at least seven keys corresponding to the letters selected from the group consisting of Z, X, C, V, B, N, M, the period, the comma, and the question mark; wherein at least seven of the selected keys have the same location as in the lower row of the QWERTY keyboard.

15. The keyboard of claim 2 further comprising:

the home row having keys corresponding to the letters E, I, and R; wherein at least four of the remaining keys, selected from the group consisting of the letters A, S, D, H and L, have the same location as in the home row of a conventional QWERTY keyboard;

the upper row, adjacent to said home row; having at least four keys corresponding to the letters selected from the group consisting of the letters Q, W, Y, U, and P, wherein at least four of the keys corresponding to the letters Q, W, Y, U, and P have the same location as in the upper row of the QWERTY keyboard; and the lower row, having at least seven keys corresponding to the letters selected from the group consisting of Z, X, C, V, B, N, M, the period, the comma, and the question mark; wherein at least seven of the selected keys have the same location as in the lower row of the QWERTY keyboard.

16. The keyboard of claim 2 further comprising:

the home row having keys corresponding to the letters E, I, R and N; wherein at least four of the remaining keys, selected from the group consisting of the letters A, S, D, H and L, have the same location as in the home row of a conventional QWERTY keyboard;

the lower row, adjacent to said home row, having at least seven keys corresponding to the letters selected from the group consisting of Z, X, C, V, B, M, the period, the comma, and the question mark; wherein at least seven of the selected keys have the same location as in the lower row of the QWERTY keyboard.

17. The keyboard of claim 2, further comprising:

the home row having keys corresponding to the letters E, T, O, I, R and N; wherein at least four of the remaining keys, selected from the group consisting of the letters A, S, D, H and L, have the same location as in the home row of the conventional QWERTY keyboard;

an upper row, adjacent to said home row, having at least five keys corresponding to the letters selected from the group consisting of the letters Q, W, Y, U, and P, wherein at least four of the keys corresponding to the letters Q, W, Y, U, and P have the same location as in the upper row of the QWERTY keyboard; and a lower row, adjacent to said home row, having at least nine keys corresponding to the letters selected from the group consisting of Z, X, C, V, B, M, the period, the comma, and the question mark; wherein at least nine of the selected keys have the same location as in the lower row of the QWERTY keyboard.

* * * * *